(12) United States Patent (10) Patent No.: US 7,394,883 B2
Funakubo et al. (45) Date of Patent: Jul. 1, 2008

(54) MULTIPLE ANTENNA SYSTEM

(75) Inventors: Toshiaki Funakubo, Kawasaki (JP); Hironobu Sunden, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 693 days.

(21) Appl. No.: 10/926,288

(22) Filed: Aug. 25, 2004

(65) Prior Publication Data

US 2005/0208976 A1 Sep. 22, 2005

(30) Foreign Application Priority Data

Mar. 8, 2004 (JP) ............................. 2004-064363

(51) Int. Cl.
*H04L 7/00* (2006.01)
(52) U.S. Cl. ....................... 375/356; 375/267
(58) Field of Classification Search ........................ None
See application file for complete search history.

(56) References Cited

U.S. PATENT DOCUMENTS

| 5,805,983 | A | * | 9/1998 | Naidu et al. | ............. | 455/67.16 |
| 6,094,562 | A | | 7/2000 | Zhong | | |
| 6,477,154 | B1 | | 11/2002 | Cheong et al. | | |
| 7,043,271 | B1 | * | 5/2006 | Seto et al. | ................ | 455/562.1 |
| 2002/0191565 | A1 | * | 12/2002 | Mani et al. | .................. | 370/334 |

FOREIGN PATENT DOCUMENTS

| EP | 1 085 678 | 3/2001 |
| EP | 1 395 011 | 3/2004 |
| JP | 2002-118870 | 4/2002 |
| JP | 2002-335560 | 11/2002 |
| WO | WO 98/04052 | 1/1998 |
| WO | WO 98/36601 | 8/1998 |

OTHER PUBLICATIONS

European Search Report dated Jun. 8, 2005 Application # EP04020279.

* cited by examiner

*Primary Examiner*—Dac V Ha
(74) *Attorney, Agent, or Firm*—Katten Muchin Rosenman LLP

(57) ABSTRACT

A multiple-antenna system including a base station apparatus and a plurality of antenna apparatuses connected to the base station via optical cables is provided. The system comprises a first antenna apparatus and a second antenna apparatus connected to each other via an electric cable. Each of the first and second antenna apparatuses receives a reference pulse from the base station apparatus via the optical cables, and estimates a time difference between the received pulse and the reference pulse supplied from the counterpart antenna apparatus via the electric cable. At least one of the first and second antenna apparatuses adjusts signal transmission timing based on the time differences estimated by the first and second antenna apparatuses.

9 Claims, 19 Drawing Sheets

MULTIPLE ANTENNA SYSTEM

BACKGROUND OF THE INVENTION

1. Field of the Invention

The present invention generally relates to a wireless communication technique, and more particularly to a multiple antenna system comprising a plurality of antenna devices, each being provided in one of multiple sectors, and a base station apparatus connected to the antenna devices via optical cables.

2. Description of the Related Art

In mobile communications systems, the space in which communication services are provided is divided into multiple cells or sectors, and wireless communication is carried out between mobile terminals located in certain sectors (or cells).

FIG. 1 is a schematic diagram illustrating a part of a code division multiple access (CDMA) system, which is typically employed in the wireless communication field. Multiple antenna units (AU) 104 are connected to the base station apparatus 110 via associated signal converters 106 and optical cables 108. The base station apparatus 110 includes optical to electric converters 112, each being connected to one of the optical cables 108, and baseband processors 114 connected to the associated signal converters 112.

One of the antenna units 104 is provided in each sector to transmit and receive radio signals to and from a mobile terminal (not shown) located in the sector. When receiving signals, the antenna unit 104 converts the radio signals to digital signals. When transmitting signals, the antenna unit 104 converts digital signals to analog signals.

The signal converter 106 performs electric-to-optical conversion to convert electric signals (uplink signals) received at the antenna unit 104 and converted into the digital format, into optical signals. In addition, the signal converter 106 performs optical-to-electric conversion to convert optical signals (downlink signals) carrying information into electric signals.

The optical cable 108 transmits optical signals between the antenna unit 104 (to be more precise, the signal converter 106) and the base station apparatus 110. The optical cable 108 is capable of signal transmission with less transmission loss and less signal degradation because it allows optical signals to propagate through it.

The signal converter 112 converts the optical signals (uplink signals) to electric signals, and converts electric signals (downlink signal) carrying information into optical signals.

The baseband processor 114 carries out baseband processes, such as spread spectrum using a code for a transmission signal and despreading of a received signal. The baseband processor 114 communicates with a higher-layer apparatus or a core network (neither shown).

The above-described baseband apparatus is disclosed in, for example, JP 2002-335560A and JP 2002-118870A.

A mobile terminal moves across sectors in a service area, while continuing wireless communication, using handover. Signals input to and output from the antenna units 104 provided to the respective sectors have to be synchronized with each other. To this regard, the technique disclosed in JP 2002-335560A assumes that the quantity of delay is measured and adjusted manually, and therefore, manual work is required not only when setting or adding a new base station apparatus, but also when modifying the route of the optical fiber or repairing degradation due to elapse of time. Burden and cost of maintenance and control operations increase.

In JP 2002-118870A, the quantity of delay is measured by test radiation of radio waves in the air. However, since the communication environment changes every moment, the main path of the test wave may happen to be blocked by obstacle. Accordingly, the delay cannot always be measure at high precision. The radio wave transmitted from and received at a mobile terminal requires only such a power level so as to propagate between the mobile terminal and the antenna unit connected to the base station apparatus. In contrast, the test wave emitted from an antenna unit is strong enough to propagate to another antenna unit located in the adjacent cell. Accordingly, the test wave becomes a large interfering wave for the radio signal transmitted from the mobile terminal.

Returning to FIG. 1, one of the baseband processors 114 is provided for each antenna unit 104 by one-to-one correspondence. Accordingly, when increasing the number of sectors, additional antenna units 104 and baseband processors 114 have to be provided. This arrangement is suitable to such applications when the number of users accommodated in the system is increased by increasing the resources of the antenna units 104 and baseband processors 114. However, this arrangement is unsuitable to an application of increasing the area size of each baseband processor, that is, an application where the number of the antenna units 104 is increased to expand the communicating space, while maintaining the number of users accommodated by the system (or the overall sectors). This is because increasing the number of antenna units 104 to expand the communicating space results in excessive resources and processing capacity. Such application includes communications in mountain areas, sparsely populated regions, underground malls, and inside tunnels or buildings.

FIG. 2 illustrates the above-described application to increase the area size per baseband processor. In this example, at most a hundred people are likely to conduct wireless communication inside the five-story building. Each baseband processor 114 is capable of performing baseband processing for signal transmission of a hundred users. To allow wireless communications at all the floors, an antenna unit 104 has to be provided to each floor. In this conventional case, the base station apparatus 110 located in the basement has to be furnished with five baseband processors 114, which is excessive for a hundred users accommodated in this building.

SUMMARY OF THE INVENTION

The present invention was conceived to overcome the above-described problems, and the present invention aims to accurately synchronize multiple antenna apparatuses in a multiple antenna system.

In one aspect of the invention, a multiple-antenna system including a base station apparatus and a plurality of antenna apparatuses connected to the base station via optical cables is provided. The system comprises a first antenna apparatus and a second antenna apparatus connected to each other via an electric cable. Each of the first and second antenna apparatuses receives a reference pulse from the base station apparatus via the optical cables, and estimates a time difference between the received pulse and the reference pulse supplied from the counterpart antenna apparatus via an electric signal. At least one of the first and second antenna apparatuses adjusts signal transmission timing based on the time differences estimated by the first and second antenna apparatuses.

With this arrangement, antenna apparatuses connected to a base station apparatus can be accurately synchronized with each other in the multiple antenna system.

BRIEF DESCRIPTION OF THE DRAWINGS

Other objects, features, and advantages of the present invention will become more apparent from the following detailed description when read in conjunction with the accompanying drawings, in which.

DETAILED DESCRIPTION OF THE PREFERED EMBODIMENTS

The preferred embodiments of the present invention are now described below with reference to the attached drawings.

Figure 1:
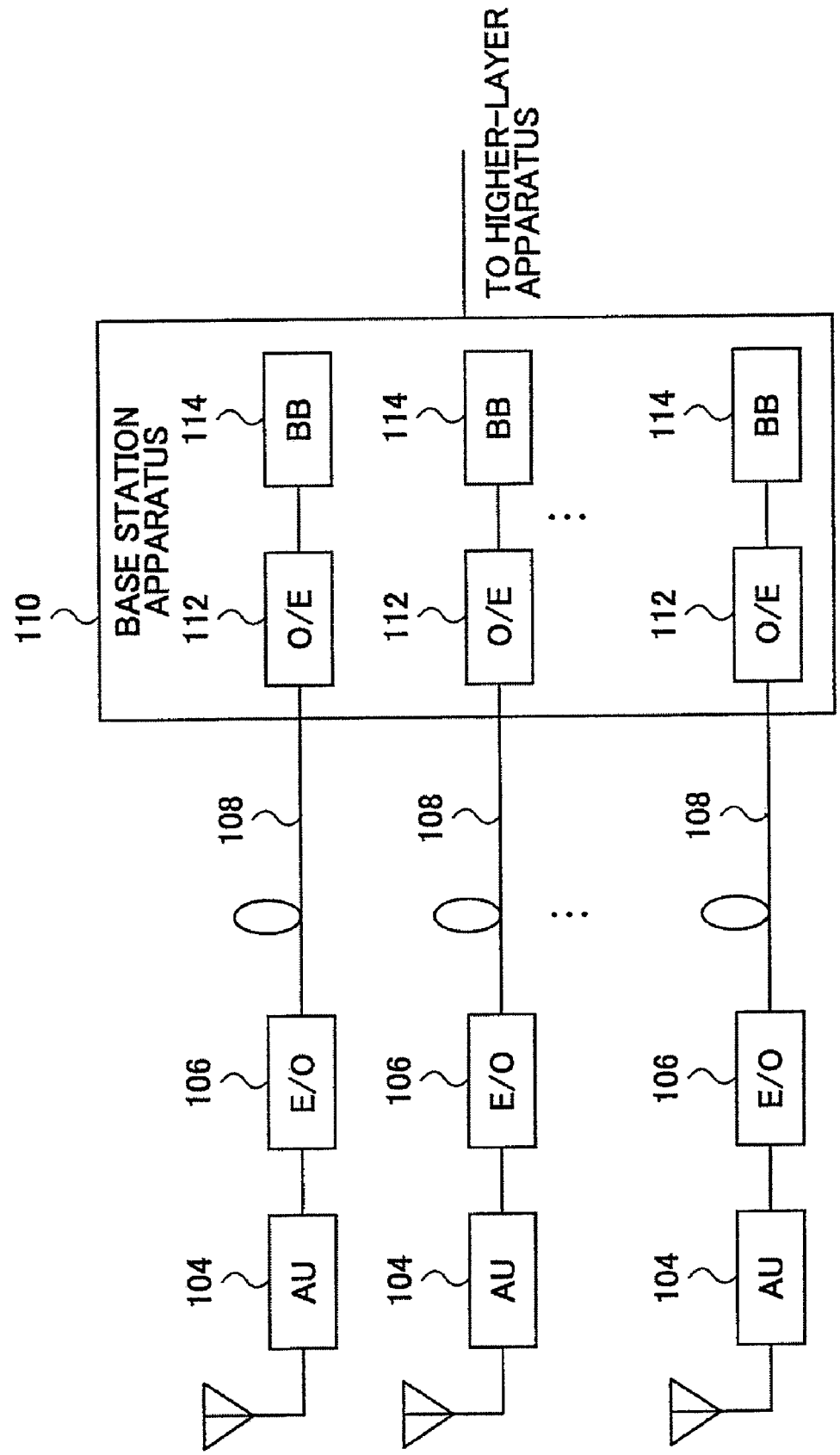
FIG. 1 is a schematic diagram illustrating a typical wireless communications system.
Figure 2:
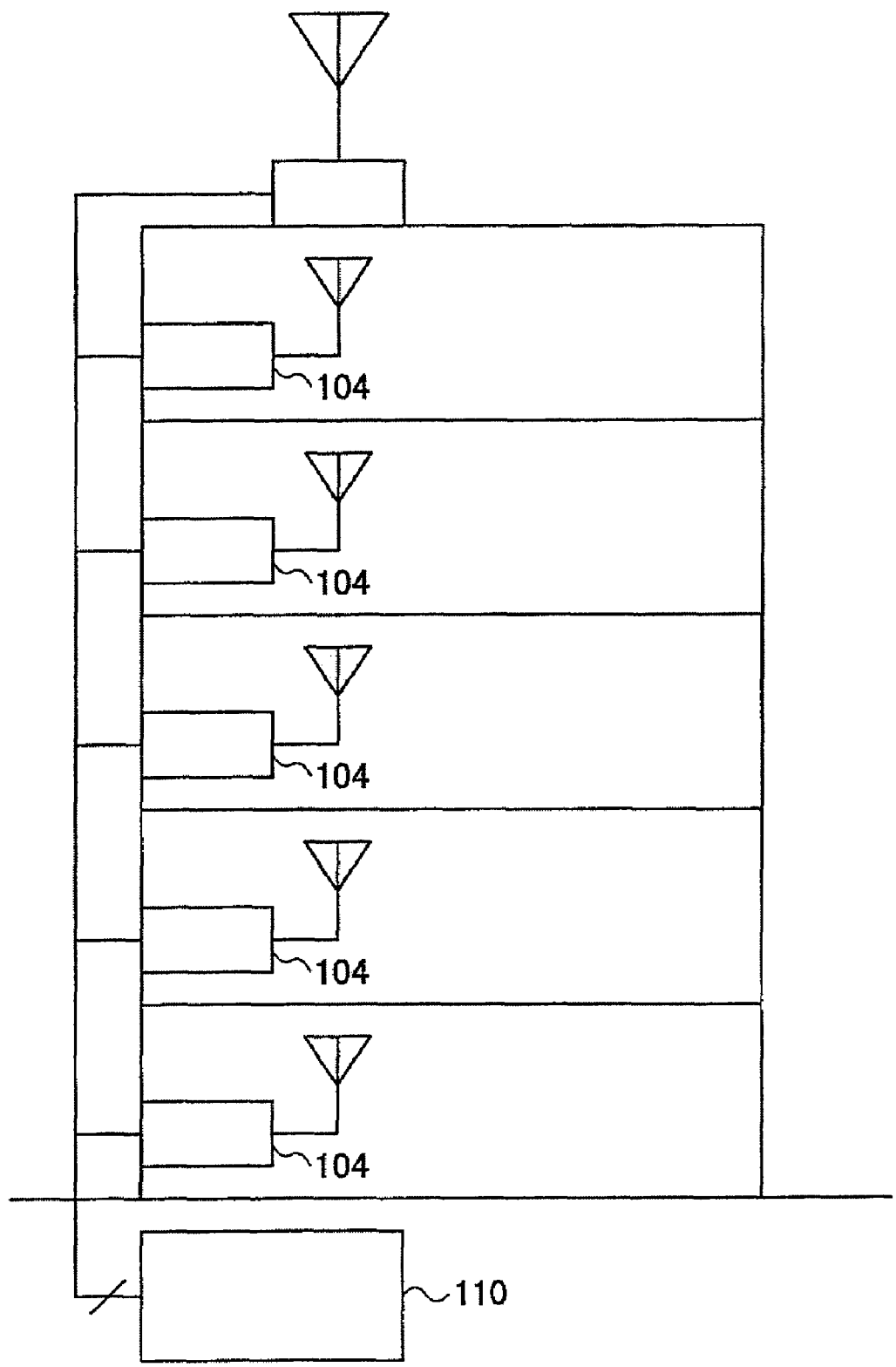
FIG. 2 is an example of a communications system installed in a building.
Figure 3:
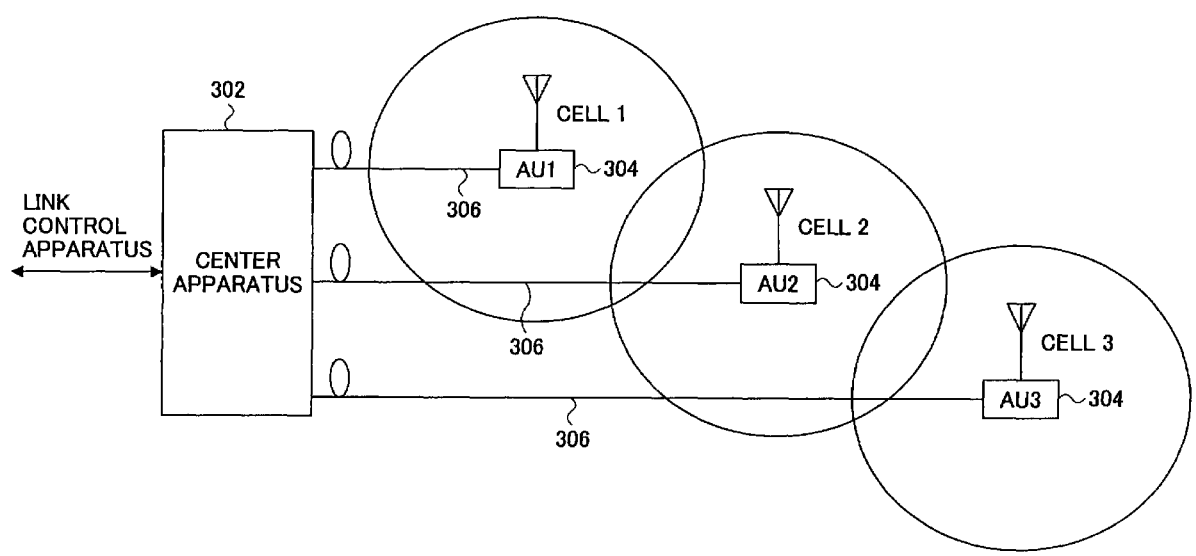
FIG. 3 is a schematic diagram illustrating a communications system according to the first embodiment of the invention.

FIG. 3 is a schematic diagram of a communications system according to the first embodiment of the invention. The system includes a center apparatus (base station apparatus) 302, and multiple antenna apparatuses (AU) 304, each antenna apparatus being provided in one of cells or sectors and connected to the center apparatus 302 via an associated optical cable 306. The center apparatus 302 is connected to a higher-layer apparatus or a network element (not shown) for controlling communication links. In this embodiment, the antenna apparatus 304 is placed in each cell to communicate with mobile devices (not shown) located in the cell.

Figure 4:
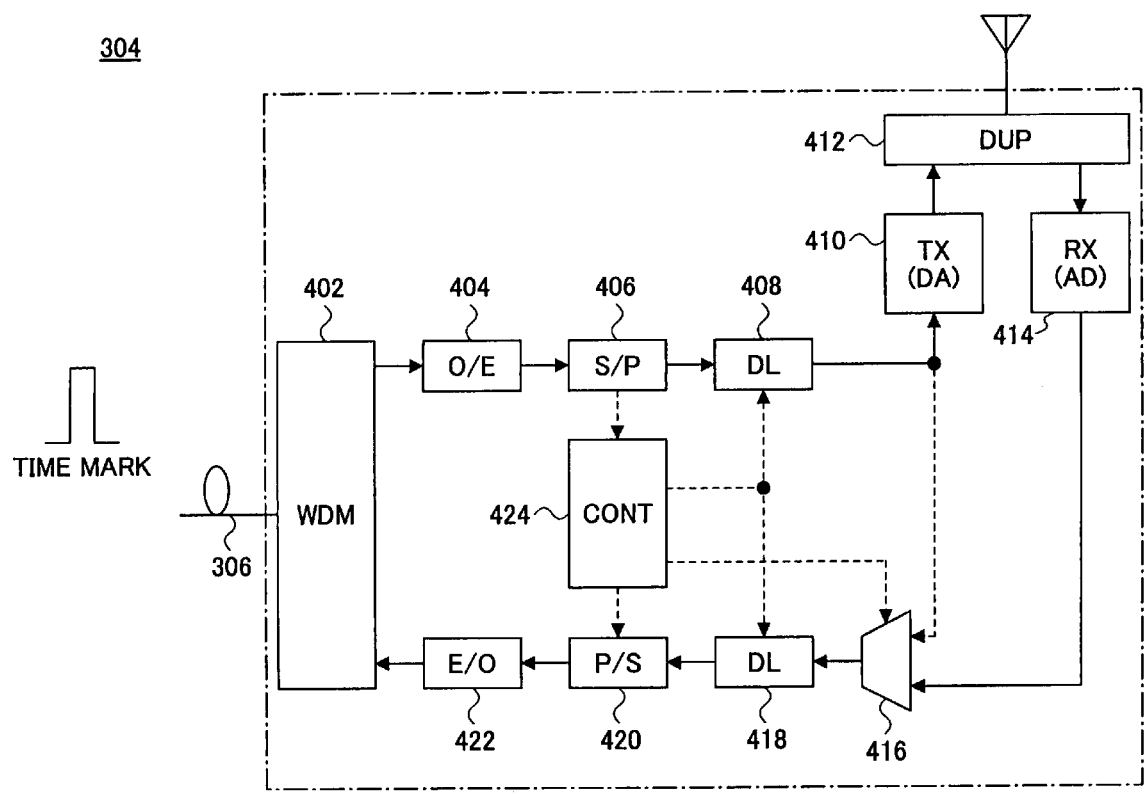
FIG. 4 is a block diagram of the antenna apparatus used in the communications system shown in FIG. 3.

FIG. 4 is a block diagram of the antenna apparatus 304. The antenna apparatus 304 comprises a wave division multiplex (WDM) filter 402, an optical-to-electric (O/E) converter 404, a serial-to-parallel (S/P) converter 406, a delay adjusting unit 408, a transmission unit 410, and a duplexer 412. The antenna apparatus 304 also comprises a receiving unit 414, a selector 416, a delay adjusting unit 418, a parallel-to-serial (P/S) converter 420, an electric-to-optical (E/O) converter 422, and a controller 424.

The WDM filter 402 receives an optical signal with wavelength $\lambda 1$, which is a downlink signal transmitted through the optical cable 306, and supplies the optical signal to the optical-to-electric converter 404. The WDM filter 402 also receives an optical signal with wavelength $\lambda 2$ from the electric-to-optical converter 422, and transmits the optical signal, as an uplink signal, through the optical cable 306.

The optical-to-electric converter 404 converts an optical signal to an electric signal. The serial-to-parallel converter 406 converts serial signals into digital amplitude information. The delay adjusting unit 408 adjusts (or delays) transmission timing by a quantity designated by the controller 424. The transmission unit 410 converts a digital signal being transmitted into an analog signal, and implements a process required for signal transmission, including frequency conversion and power amplification. The processed signal is transmitted from an antenna element via the duplexer 412. The receiving unit 414 performs signal processing, such as frequency conversion, on the signal received via the antenna element and the duplexer 412, and converts the signal to a digital signal.

The selector 416 selects one of a signal output from the delay adjusting unit 408 and a signal supplied from the receiving unit 414 in response to an instruction from the controller 424, and supplies the selected signal to the delay adjusting unit 418. The delay adjusting unit 418 adjusts (or delays) the selected signal by a quantity designated by the controller 424. The parallel-to-serial (P/S) converter 420 converts digital amplitude data into a serial signal. The electric-to-optical (E/O) converter 422 converts the electric signal to an optical signal.

Figure 5:
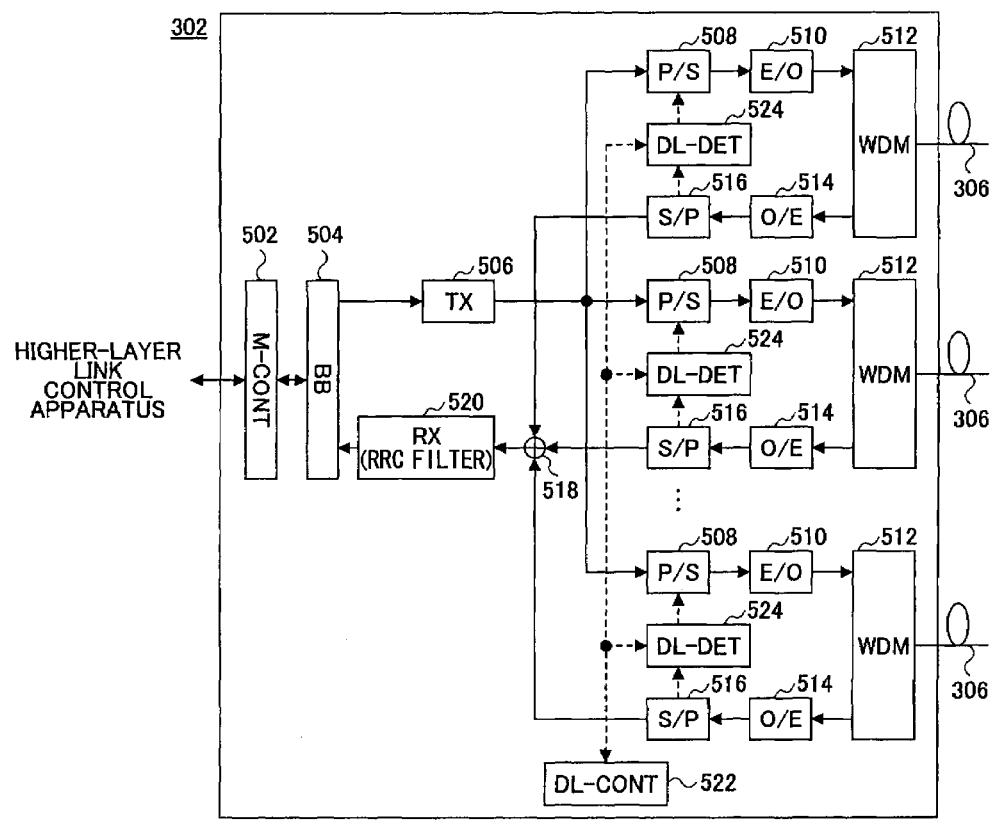
FIG. 5 is a block diagram of the center apparatus used in the communications system shown in FIG. 3.

FIG. 5 is a block diagram of the center apparatus (or the base station apparatus) 302 used in the communications system shown in FIG. 3. The center apparatus 302 includes a master controller (M-CONT) 502, a baseband processing unit (BB) 504, a transmission unit 506, a parallel-to-serial (P/S) converter 508, an electric-to-optical (E/O) converter 510, and a WDM filter 512. The center apparatus 302 also includes an optical-to-electric (O/E) converter 514, a serial-to-parallel (S/P) converter 516, a digital adder 518, a receiving unit 520, a delay control unit 522, and a delay detecting unit 524. A set of components of the P/S converter 508, the E/O converter 510, a WDM filter 512, the O/E converter 514, the S/P converter 516, and the delay detecting unit 524 is provided for each of the antenna apparatuses 304.

The master controller (M-CONT) 502 controls communications among the multiple antenna apparatuses 304, while communicating with the higher-layer link control apparatus. The baseband processing unit 504 processes the baseband signal, performing code spreading and despreading and other necessary processing.

The transmission unit 506 processes the downlink digital electric signal into a signal format suitable to distribution to each of the antenna apparatuses 304. The transmission unit 506 and the receiving unit 520 perform bandlimiting operations, using an impulse response filter equivalent to a root Nyquist filter or a root raised cosine (RRC) filter.

The parallel-to-serial (P/S) converter 508 converts the digital amplitude data bus to a serial signal. The electric-to-optical (E/O) converter 510 converts the electric signal to an optical signal. The WDM filter 512 passes a downlink signal with a certain wavelength to the optical cable, and receives an uplink signal with another wavelength from the optical cable.

The optical-to-electric (O/E) converter 514 converts an optical signal to an electric signal. The serial-to-parallel (S/P) converter 516 converts a serial signal to digital amplitude data. The digital adder 518 digitally sums up the uplink signals supplied from the respective antenna apparatuses 304. The receiving unit 520 receives an uplink digital electric signal from each of the antenna apparatuses 304, and regulates the signal format through bandlimiting operations.

In this embodiment, the center apparatus 302 does not have to use a multiplexer for branching the analog signal into multiple routes, instead, the center apparatus 302 includes a digital copy unit (not shown) configured to copy the digital signal output from the transmission unit 506. Consequently, the signals are supplied to the respective antenna apparatuses at low losses.

The bandlimiting operation is carried out at both the transmission end and the receiving end. The transmission-end bandlimiting operation may be carried out at either the center apparatus 302 or the antenna apparatus 304, while the receiving-end bandlimiting operation is performed at the receiving unit 520 of the center apparatus 302 in this embodiment.

In the conventional system, the receiving-end bandlimting operation is carried out at the front-end unit (not shown) of each antenna apparatus. In this case, if uplink signals from the respective antenna apparatuses are simply added in a digital form, the signal quality is greatly degraded due to interference between symbols unless signals, including transmission time difference in the air, input to the antenna apparatuses from mobile terminals are completely synchronized with each other. To avoid this, in the conventional system, the bandlimited uplink signals from the respective antenna apparatuses are time-multiplexed and transmitted to the center apparatus through a single optical cable. The center apparatus had to separate each signal from the multiplexed signal, and supply the separated uplink signal to the corresponding baseband processing unit provided for each of the antenna apparatuses. In other words, as many baseband processing units as the number of antenna apparatuses are required in the conventional system. In addition, because the uplink signals from the mobile terminals are time-multiplexed, reduction of throughput is of concern when the number of mobile terminals increases.

In contrast, with the arrangement of the embodiment, the number of the baseband processing units does not have to agree with the number of antenna apparatuses, and uplink signals from the respective antenna apparatuses do not have to be time-multiplexed.

Returning to FIG. 5, the delay control unit 522 and the delay detecting unit 524 cooperate to control the quantity of delay in signal transmission due to difference in lengths of the optical cables 306.

The process of controlling the quantity of delay is explained in detail below.

The delay control unit 522 instructs the delay detecting unit 524 to insert a time mark (TM) in a downlink signal. A time mark is a reference signal used for measurement of delay time, which is a certain pulse signal. The delay detecting unit 524 activates a timer or a counter (not shown) to measure a time having elapsed from the transmission of the time mark. The time mark reaches the antenna apparatus 304 via the electric-to-optical (E/O) converter 510, the WDM filter 512, and the optical cable 306.

Each antenna apparatus 304 receives the time mark at the WDM filter 402 (see FIG. 4). The received time mark is supplied to the selector 416 via the optical-to-electric (O/E) converter 404, the serial-to-parallel (S/P) converter 406, and the delay adjusting unit 408. At this time, the quantity of delay is set to a known initial value (for example, zero seconds) in the delay adjusting unit 408. It should be noted that the time mark is not radiated in the air from the transmission unit 410, but is sent back to the center apparatus 302 via the optical cable 306.

The selector 416 of the antenna apparatus 304 selects the time mark from the delay adjusting unit 408 in response to the instruction from the controller 424, and supplies the selected time mark to the delay adjusting unit 418. The quantity of delay in the delay adjusting unit 418 is also set to a known initial value (for example, zero seconds) at this time. Then, the time mark is transmitted back to the center apparatus 302 via the parallel-to-serial (P/S) converter 420, the electric-to-optical (E/O) converter 422, the WDM filter 402, and the optical cable 306.

Returning to FIG. 5 again, the time mark sent back form the antenna apparatus 304 is received at the associated WDM filter 512, and supplied to the delay detecting unit 524 via the optical-to-electric (O/E) converter 514 and the serial-to-parallel (S/P) converter 516. The delay detecting unit 524 calculates a time difference (or a counter value difference) between the transmission and the arrival of the time mark to estimate the quantity of delay of the associated antenna apparatus. The estimation result is supplied to the delay control unit 522.

The delay control unit 522 compares the delays ($\tau 1$, $\tau 2$, ..., $\tau N$) of the N antenna apparatuses 304, and specifies the antenna apparatus that has the maximum delay ($\tau max$). The delay control unit 522 gives this maximum delay ($\tau max$) to each of the delay detecting units 524.

Each of the delay detecting units 524 estimates a difference ($\Delta \tau i$) between the delay detection result ($\tau i$) of that delay detecting unit and the maximum delay ($\tau max$) supplied from the delay control unit 522. Then, the delay detecting unit 524 causes the associated antenna apparatus 304 to set a delay in the delay adjusting units 408 and 418 (FIG. 4) so as to correspond to the estimated difference ($\Delta \tau i$). Accordingly, a signal representing the time difference ($\Delta \tau i$) is supplied to the associated antenna apparatus 304 via the optical cable 306. Too be more precise, the estimated time difference ($\Delta \tau i$) corresponds to the round-trip of the optical cable, and therefore, half of the estimated time difference ($\Delta \tau i/2$) is set in the associated antenna apparatus 304.

The antenna apparatus 304 delays a downlink signal by the quantity set in the delay adjusting unit 408, and then transmits the delay-adjusted downlink signal to the mobile terminal. When receiving an uplink signal, the uplink signal selected by the selector 416 is delayed by the quantity ($\Delta \tau i$) set in the delay adjusting unit 418, and supplied to the next component. In this manner, the signal transmitted from and received at the antenna apparatus 304 is adjusted or delayed by the appropriate quantity ($\Delta \tau i$) set in the delay adjusting units 408 and 418 so as to absorb the time difference due to difference in length of optical cables. The center apparatus 302 can control signal transmission as if all the antenna apparatuses 304 are located at the same distance as that has the maximum delay ($\tau max$). Consequently, the time window for rake reception or pass search during handover can be reduced, as compared with the conventional technique that does not correct the time difference due to variation in length of optical cable.

With this embodiment, since the monitoring pulse (time mark) is not radiated in the air, undesirable interference with the operating radio waves can be prevented.

Figure 6:
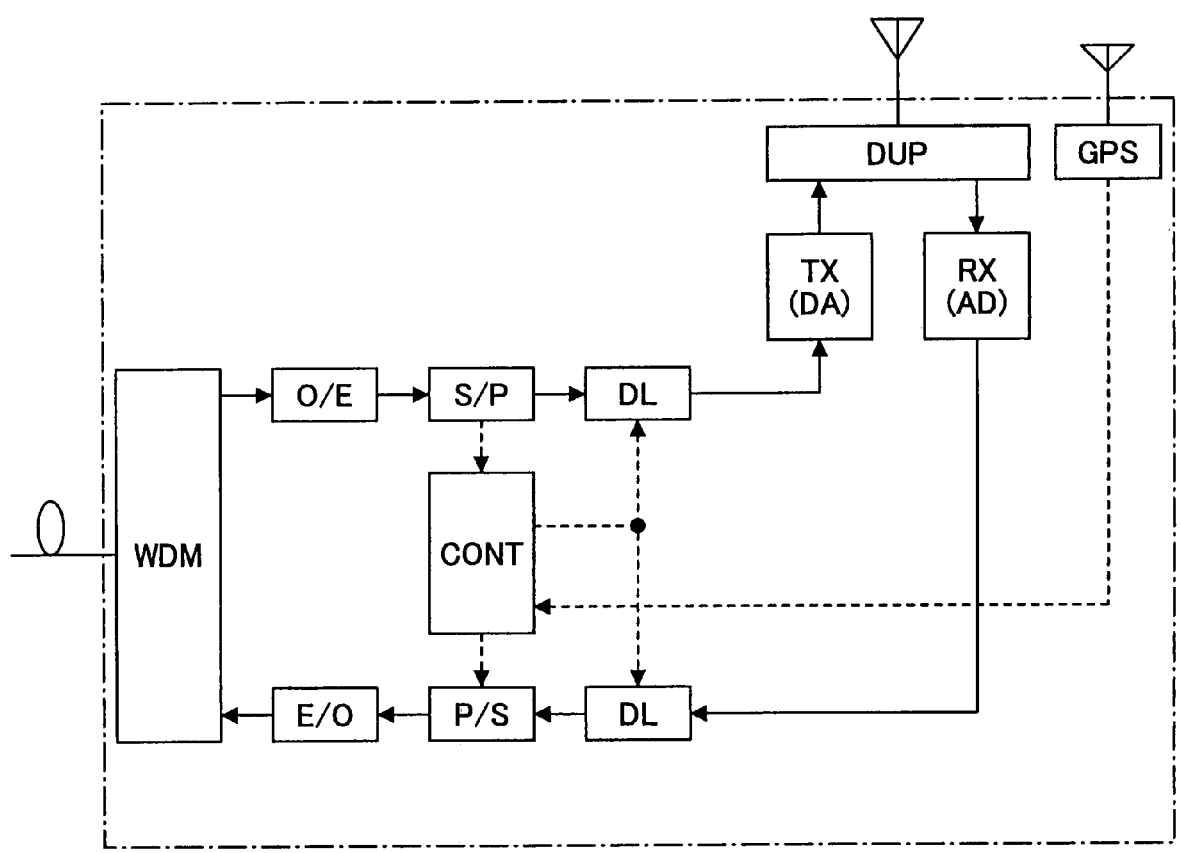
FIG. 6 illustrates a modification of the antenna apparatus.
Figure 7:
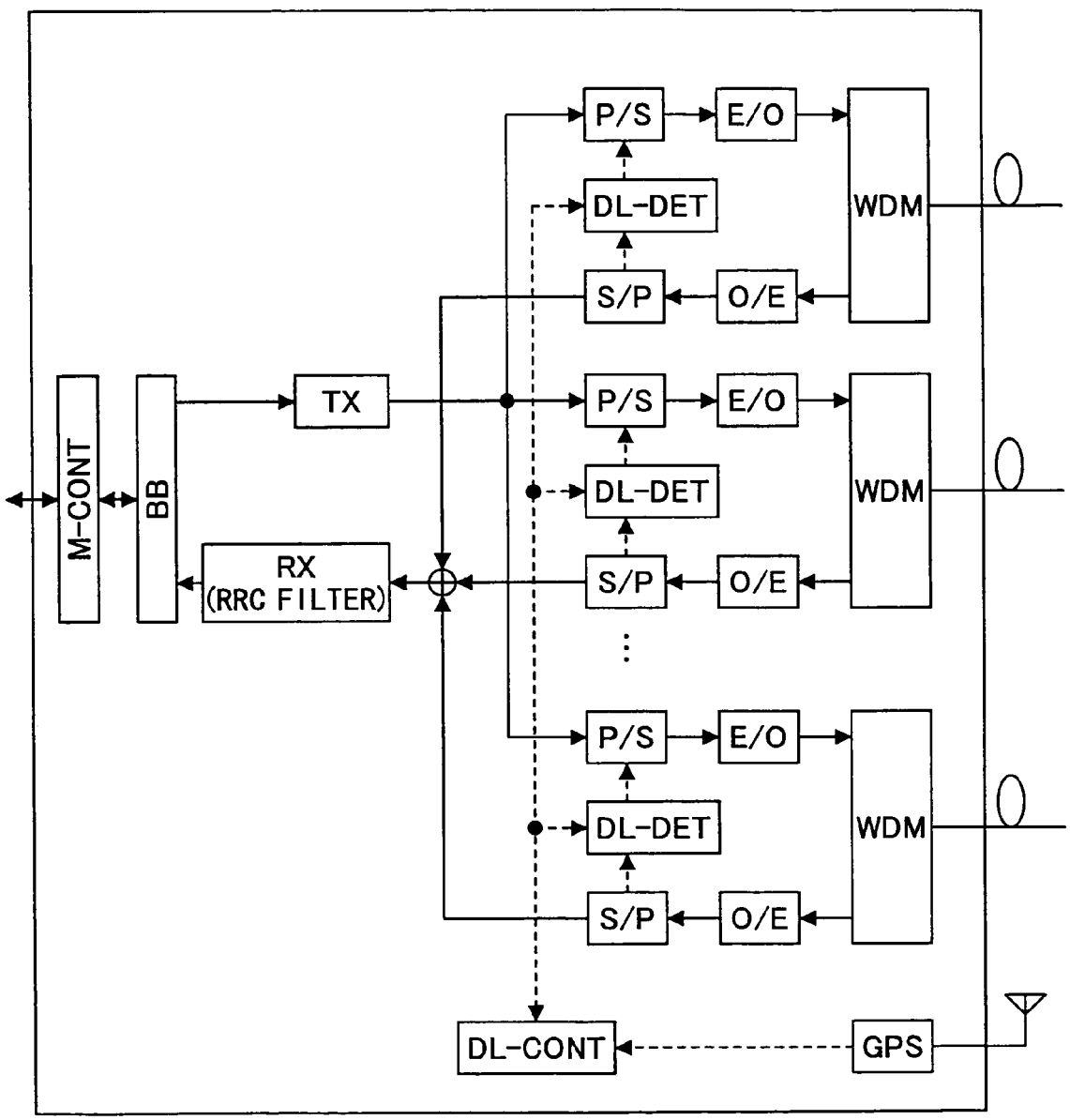
FIG. 7 illustrates a modification of the center apparatus.

Although in the embodiment the transmitting time and the arrival time of the time mark are measured using a built-in timer or a built-in counter, the present invention is not limited to this example. For example, if the antenna apparatus and the center apparatus are furnished with a GPS receiver, as illustrated in the modifications shown in FIG. 6 and FIG. 7, the center apparatus can estimate a quantity of delay for each of the antenna apparatuses making use of standard time information.

Figure 8:
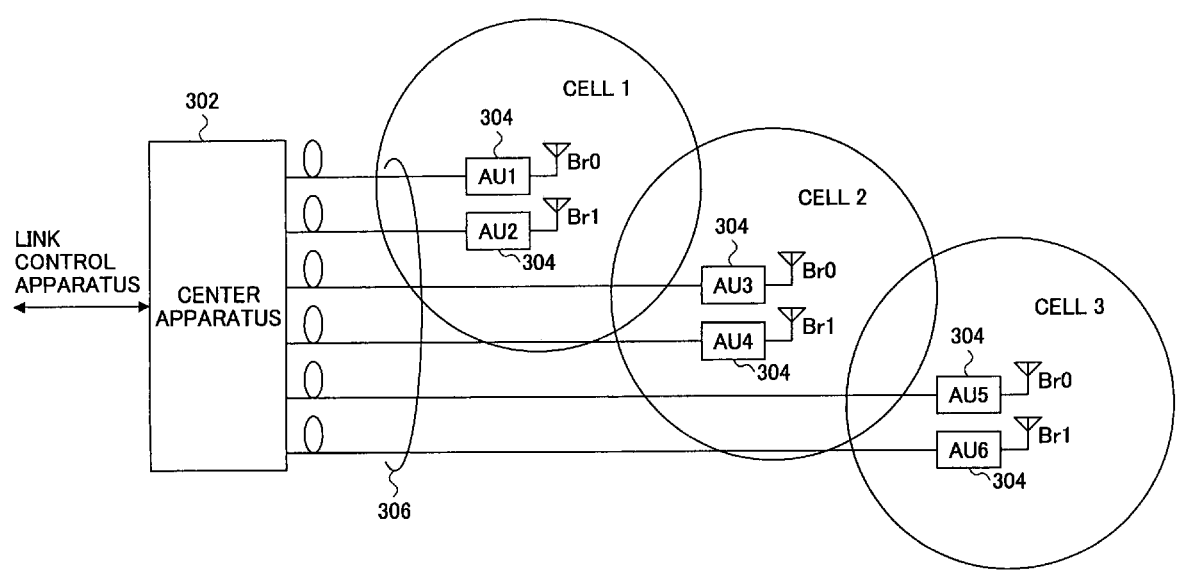
FIG. 8 is a schematic diagram of a communications system that implements antenna diversity.

FIG. 8 is a schematic diagram of a communications system that employs antenna diversity. With the technique of the first embodiment, time difference due to variation in length of optical cable can be substantially corrected. Meanwhile, antenna diversity is a technique using multiple antennas for transmitting or receiving a single signal at different phases and/or different power ratios to improve the directivity or the signal gain in order to upgrade the signal quality and increase the cell capacity. Because the same data are transmitted from different branches, communication is maintained even if one of the branches is out of order (although the cell capacity is slightly reduced). This arrangement also contributes to redundancy for reliability. To realize the application to the antenna diversity system, the center apparatus 302 is connected to multiple antenna apparatuses 304 arranged in a cell to employ antenna diversity to improve the signal quality. In the example shown in FIG. 8, two diversity branches Br0 and Br1 are provided in each of the cells 1, 2, and 3.

In performing the antenna diversity technique, the transmission direction is controlled based on the phase difference of data transmitted from and received at each branch. Accordingly, the signals of the respective diversity branches have to be precisely synthesized with each other. However, it is difficult for the discussed communications system using an optical cable to bring the two antenna apparatuses 304 (functioning as diversity branches) in precise synchronization because of clock transfer during electric-to-optical or optical-to-electric conversion. Although the technique of the first embodiment can bring the respective antenna apparatuses in sync with each other to such an extent that the time window of rake reception during handover is reduced, it cannot precisely synchronize the diversity branches so as to bring the phases to absolutely match each other. Therefore, in the second embodiment, a communications system that is capable of bringing multiple diversity branches into sync with each other is provided.

Figure 9:
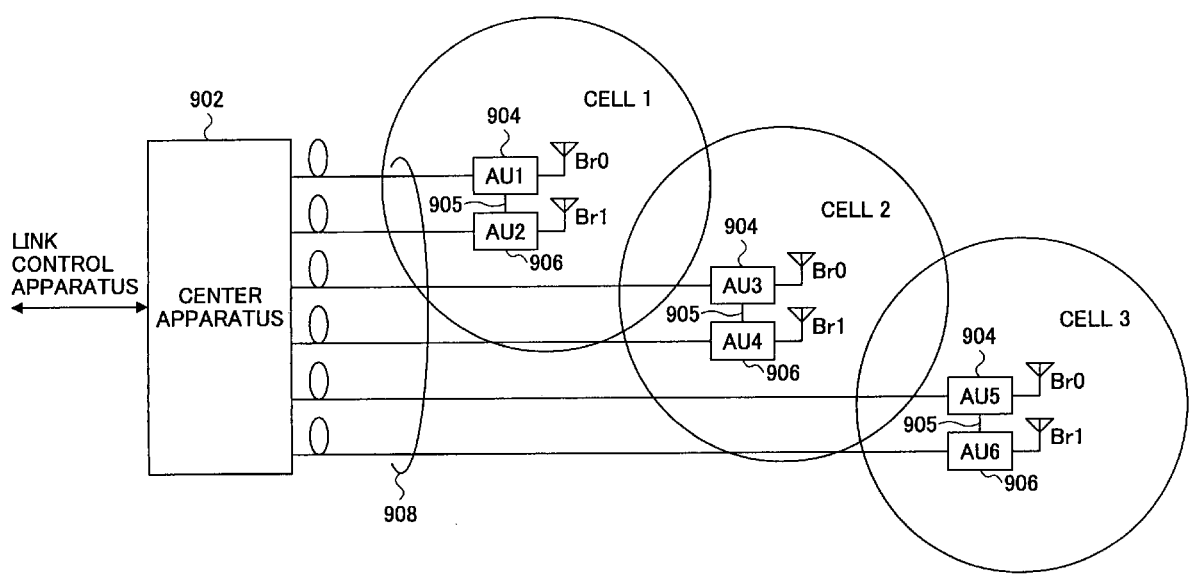
FIG. 9 is a schematic diagram of a communications system according to the second embodiment of the invention, which is suitably applicable to an antenna diversity system.

FIG. 9 is a schematic diagram of a communications system suitably applicable to an antenna diversity system according to the second embodiment of the invention. The communication system includes a center apparatus (or a base station apparatus) 902, antenna apparatuses (AU) 904 and 906 provided in each cell or each sector, and optical cables 908 connecting the center apparatuses 902 and the antenna apparatuses 904 and 906. The antenna apparatuses 904 and 906 are connected to each other using an electric cable 905, which is capable of transmitting electric signals, in each cell. The center apparatus 902 is connected to a higher-layer control apparatus (or network component) that controls communication links. The antenna apparatuses 904 and 906 provided in each cell perform the antenna diversity technique to communicate with a mobile terminal (not shown) located in the cell.

Figure 10:
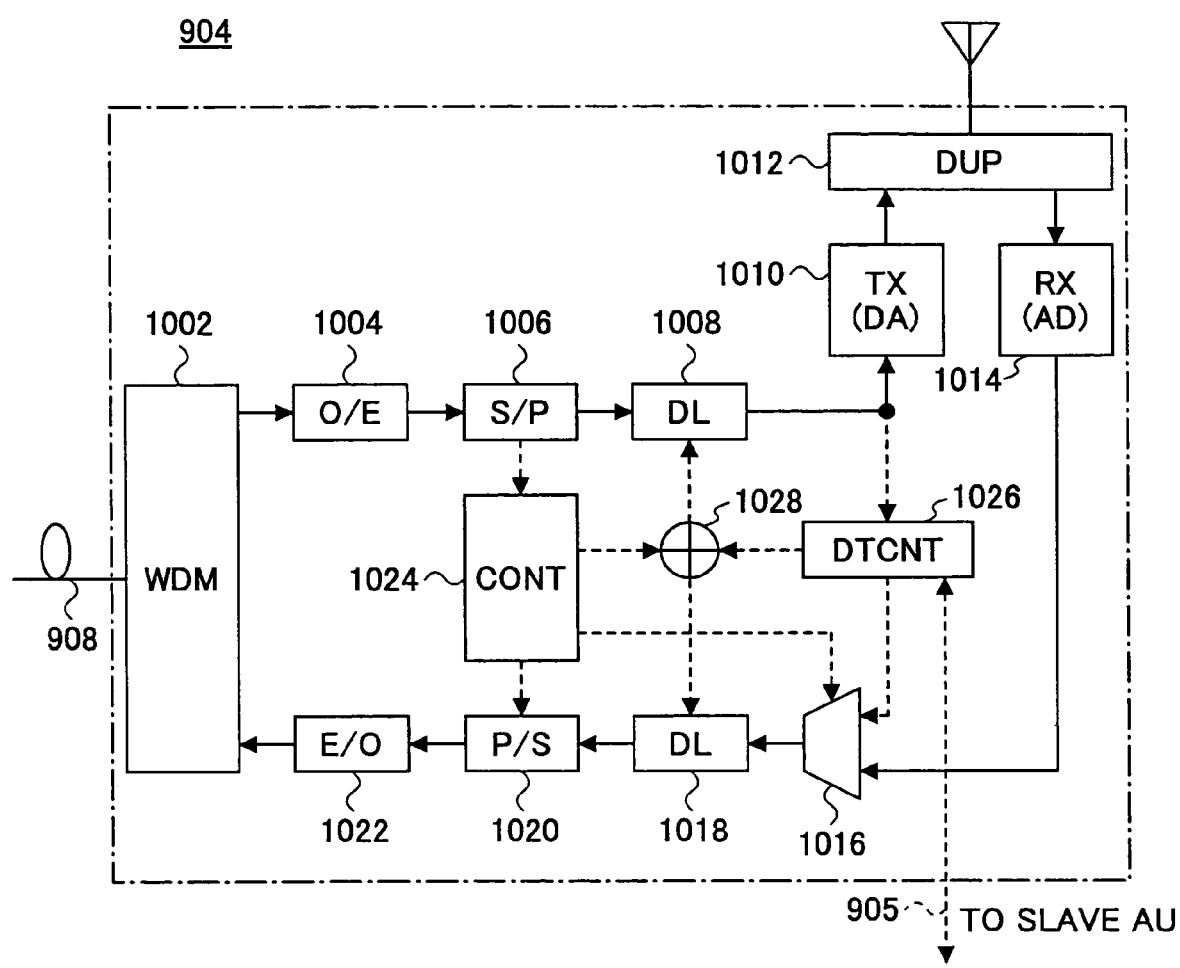
FIG. 10 is a block diagram of the antenna apparatus used in the communications system shown in FIG. 9.

FIG. 10 is a block diagram of the antenna apparatus 904 shown in FIG. 9. The antenna apparatus 904 has a similar structure to the paired antenna apparatus 906; however, the function is slightly different, which difference is described below. The antenna apparatus 904 comprises a WDM filter 1002, an optical-to-electric (O/E) converter 1004, a serial-to-parallel (S/P) converter 1006, a selector 1016, a delay adjusting unit 1008, a transmission unit 1010, and a duplexer 1012. The antenna apparatus 904 also comprises a receiving unit 1014, a delay adjusting unit 1018, a parallel-to-serial (P/S) converter 1020, an electric-to-optical (E/O) converter 1022, and a controller 1024. The antenna apparatus 904 further comprises a phase difference control unit 1026 and a signal synthesizer 1028.

The WDM filter 1002 receives an optical signal with wavelength λ1, which is a downlink signal transmitted through the optical cable 908, and supplies the optical signal to the optical-to-electric converter 1004. The WDM filter 1002 also receives an optical signal with wavelength λ2 from the electric-to-optical converter 1022, and transmits the optical signal, as an uplink signal, through the optical cable 908.

The serial-to-parallel converter 1006 and the parallel-to-serial converter 1020 perform separation and multiplexing of amplitude information. The delay adjusting units 1008 and 1018 adjust (or delay) transmission timing by a quantity designated by the controller 1024 added to a quantity designated by the phase difference control unit 1026.

The transmission unit 1010 converts a digital signal being transmitted into an analog signal, and implements a process required for signal transmission, including frequency conversion and power amplification. The processed signal is transmitted from an antenna element via the duplexer 1012. The receiving unit 1014 performs signal processing, such as frequency conversion and power amplification, on the signal received via the antenna element and the duplexer, and converts the signal to a digital signal.

The selector 1016 selects one of a signal output from the phase different control unit 1026 and a signal supplied from the receiving unit 1014, in response to an instruction from the controller 1024, and supplies the selected signal to the delay adjusting unit 1018.

Figure 11:
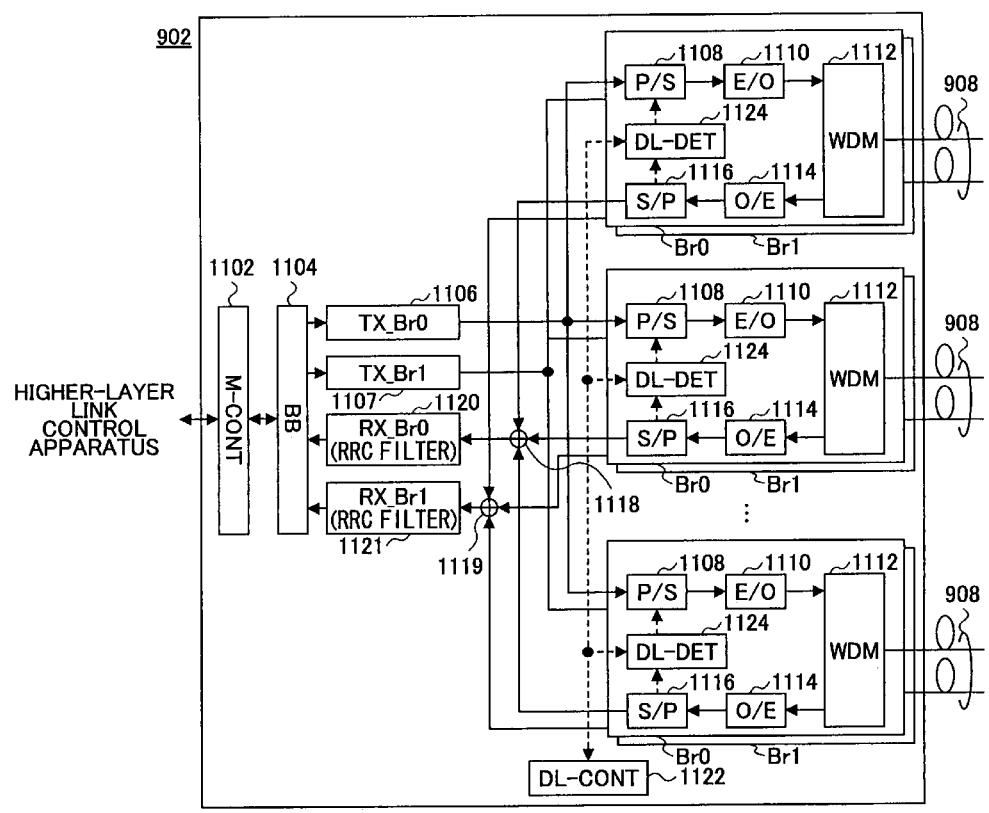
FIG. 11 is a block diagram of the center apparatus used in the communications system shown in FIG. 9.

FIG. 11 is a block diagram of the center apparatus (or the base station apparatus) 902 used in the communications system shown in FIG. 9. The center apparatus 902 includes a master controller (M-CONT) 1102, a baseband processing unit (BB) 1104, transmission units 1106 and 1107 provided for the branches Br0 and Br1, respectively, a parallel-to-serial (P/S) converter 1108, an electric-to-optical (E/O) converter 1110, and a WDM filter 1112. The center apparatus 92 also includes an optical-to-electric (O/E) converter 1114, a serial-to-parallel (S/P) converter 1116, digital adders 1118 and 1119 provided for the branches Br0 and Br1, respectively, and receiving units 1120 and 1121 provided for the branches Br0 and Br1, respectively. The center apparatus 902 further comprises a delay control unit 1122, and a delay detecting unit 1124. A set of components of the P/S converter 1108, the E/O converter 1110, a WDM filter 1112, the O/E converter 1114, the S/P converter 1116, and the delay detecting unit 1124 is provided for each of the branches Br0 and Br1 of each antenna apparatus 904.

The master controller (M-CONT) 1102 controls communications among the multiple antenna apparatuses 904, while communicating with a higher-layer link control apparatus. The baseband processing unit 1104 processes the baseband signal, performing code spreading and despreading and other necessary processing.

The transmission units 1106 and 1107 perform orthogonal modulation/demodulation and bandlimiting operations on the digital electric signals for the branches Br0 and Br1, respectively, to process the downlink electric signal into a signal format suitable to distribution to each of the antenna apparatuses 904. The receiving units 1120 and 1121 also perform bandlimiting operations.

The parallel-to-serial (P/S) converter 1108 and the serial-to-parallel (S/P) converter 1116 perform multiplexing and separation of amplitude information. The electric-to-optical (E/O) converter 1110 converts the electric signal to an optical signal. The optical-to-electric (O/E) converter 1114 converts an optical signal into an electric signal.

The WDM filter 1112 passes a downlink signal with a certain wavelength to the optical cable 908, and receives an uplink signal with another wavelength from the optical cable 908. The digital adders 1118 and 1119 digitally sum up the uplink signals from each of the antenna apparatuses 904 for the respective branches Br0 and Br1. The receiving units 1120 and 1121 receive uplink digital electric signals from the branches Br0 and Br1, respectively, of each of the antenna apparatuses 904, and regulate the signal format through band-limiting operations.

The delay control unit 1122 and the delay detecting unit 1124 control and adjust the quantity of delay in signal transmission due to difference in length of the optical cables 908 connected to the antenna apparatuses 904 and 906 of the respective cells.

Figure 12:
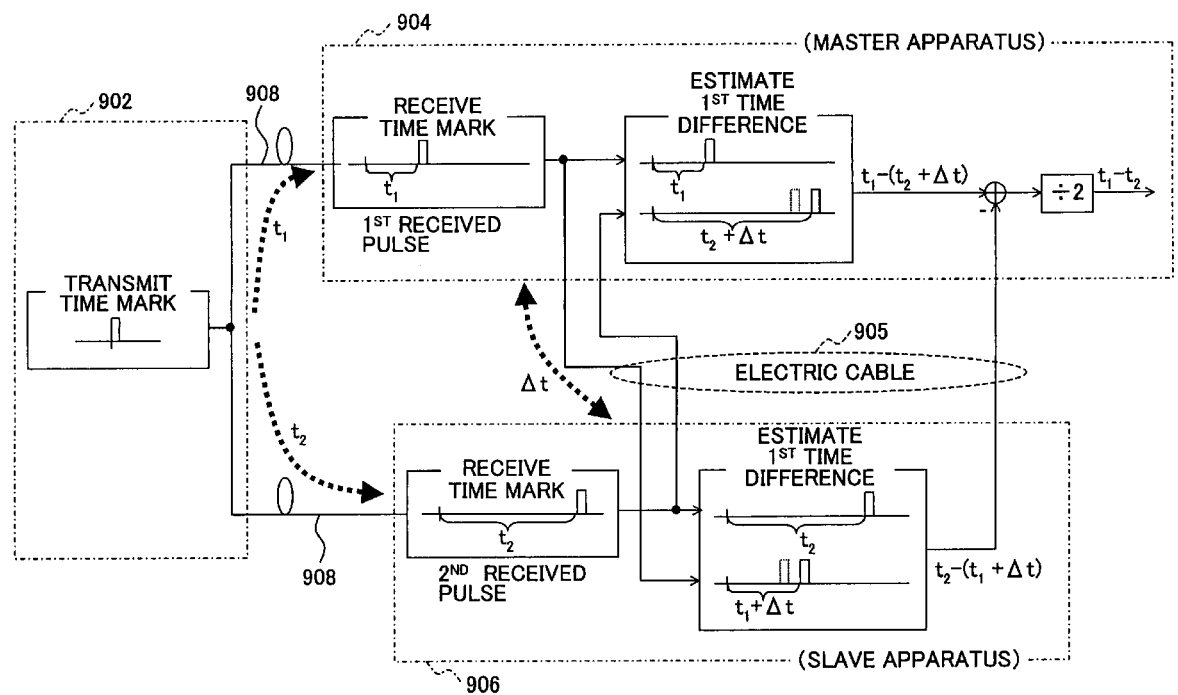
FIG. 12 is a diagram used to explain phase adjustment between two antenna apparatuses performing antenna diversity.

FIG. 12 illustrates how the phases of the paired antenna apparatuses 904 and 906 are adjusted. A time mark is transmitted as a reference signal from the center apparatus 902 to the antenna apparatuses 904 and 906. The time mark may be a pulse, as illustrated in FIG. 12, but it may be any type of signal as long as it can be used as the time reference.

The time mark (or the reference pulse) reaches the antenna apparatus 904, which is one of the diversity branches, through the optical cable 908 after time t1. The time mark received at the antenna apparatus 904 is called "the first received pulse". The antenna apparatus 904 is called a "master apparatus". The first received pulse is supplied to the antenna apparatus 906, which is the other of the diversity branches, through the electric cable 905. The first received pulse reaches the antenna apparatus 906 with a delay of Δt corresponding to the length of the electric cable 905.

The electric cable 905 connected between the antenna apparatuses 904 and 906 needs to be capable of transmitting electric signals. If an optical signal is transmitted between the antenna apparatuses 904 and 906, clock transfer is required from the electric signal to an optical signal, which makes it difficult to achieve accurate phase alignment.

The time mark also reaches the other antenna apparatus 906 after time t2 through the optical cable 908. The time mark received at the antenna apparatus 906 is called "the second received pulse", and the antenna apparatus 906 is called a "slave apparatus". The second received pulse is supplied to the antenna apparatus (master apparatus) 904. The second received pulse reaches the antenna apparatus 904 with a delay of Δt corresponding to the length of the electric cable 905.

The master apparatus 904 estimates the time difference between the first received pulse and the second received pulse supplied from the slave apparatus 906. This time difference t1−(t2+Δt) is called "the first time difference". The slave apparatus 906 also estimates the time difference between the second received pulse and the first received pulse supplied from the master apparatus 904. This time difference t2−(t1+Δt) is called "the second time difference". The second time difference is supplied to the master apparatus 904 via the electric cable 905. The second time difference is supplied as data to the master apparatus 904, not as the pulse signal. The master apparatus 904 calculates the difference between the first time difference and the second time difference, and divides the calculated difference by two (2) to obtain a time different t1−t2 between the master apparatus 904 and the slave apparatus 906.

Based on the time difference t1−t2, values set in the delay adjusting units 1008 and 1018 of each of the master and the slave apparatuses are determined so as to control the time difference between the diversity branches 904 and 906. With this arrangement, precise phase alignment between the master apparatus 904 and the slave apparatus 906 is achieved in each cell.

Figure 13:
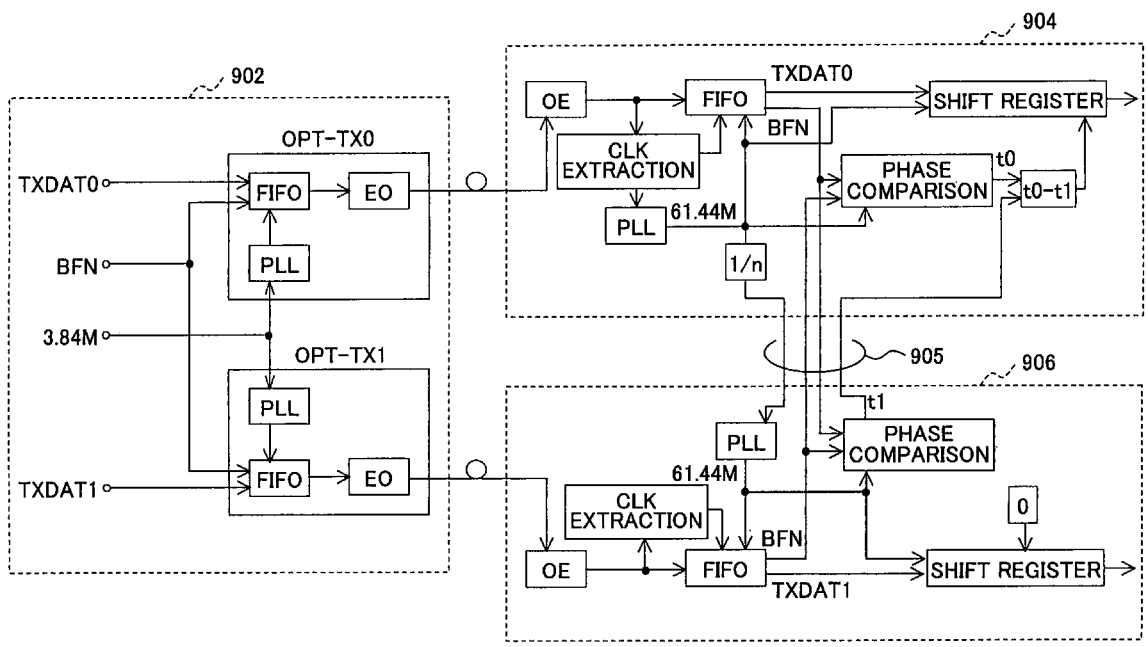
FIG. 13 illustrates the hardware structure of the communications system shown in FIG. 9.

FIG. 13 illustrates an example of the hardware structure of the communications system according to the second embodiment of the invention. The two data signals TXDAT0 and TXDAT1 in the center apparatus 902 correspond to signals supplied to the transmission units 1106 and 1107 from the baseband processing unit 1104 shown in FIG. 11. These data signals TXDAT0 and TXDAT1 contain time marks, and they are transferred by the associated FIFO memories according to clocks for optical transmission, which are synchronized relative to clocks for electric signals, but not in absolute synchronization due to frequency divided ratio. These data signals are converted into optical signals, and transmitted to the antenna apparatuses 904 and 906.

Each of the master apparatus 904 and the slave apparatus 906 converts the received optical signal into an electric signal, to which a clock for the electric signal is given by the associated FIFO memory. The clocked electric signal is supplied to the other antenna apparatus. The time difference between the two received time marks is obtained from phase comparison. The first time difference t0 is represented as TXDAT0−(TXDAT1+ΔT), and the second time difference t1 is represented as TXDAT1−(TXDAT0+ΔT), where ΔT is a delay introduce by data transmission through the electric cable 905.

Figure 14:
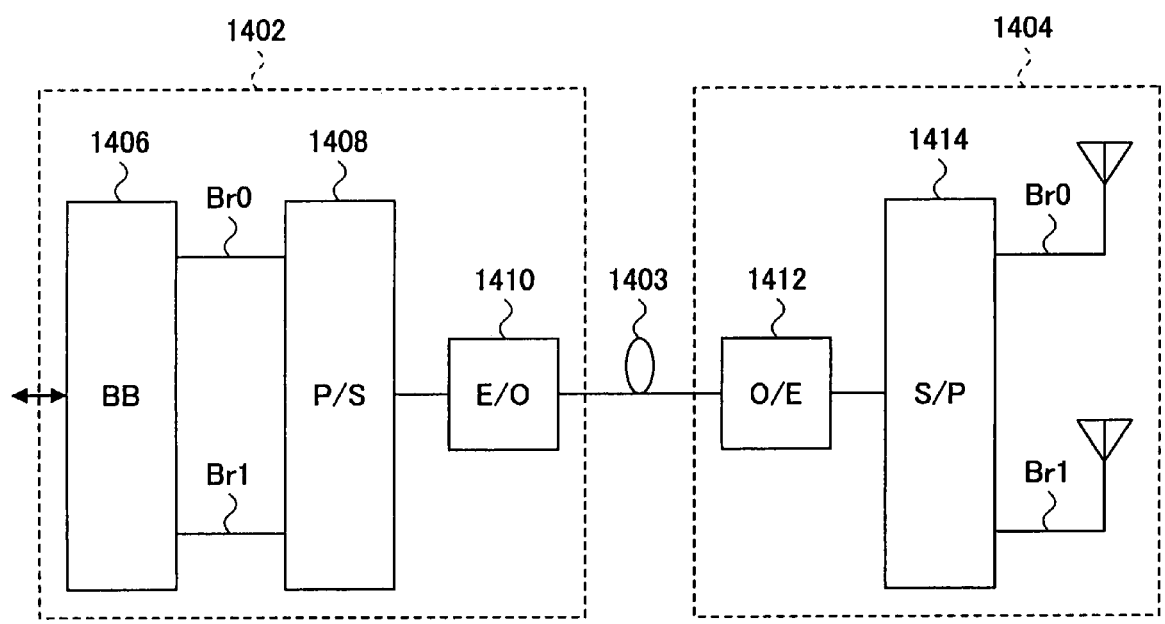
FIG. 14 illustrates an antenna apparatus and a center apparatus connected to the antenna apparatus according to the third embodiment of the invention.

FIG. 14 illustrates a center apparatus 1402 and an antenna apparatus 1404 according to the third embodiment of the invention. In FIG. 14, only those components that are particularly relevant to this embodiment, and other components (such as transmit power amplifiers) are omitted. The configuration shown in FIG. 14 is directed to diversity transmission performed on downlink signals; however, the same applies to diversity receiving on uplink signals. In diversity receiving, synchronous detection (path estimation for rake receiving) has to be performed by the baseband processing unit at the symbol level, taking into account delay over the airways. In this embodiment, the center apparatus 1402 has a baseband (BB) processing unit 1406, a parallel-to-serial converter 1408, and an electric-to-optical converter 1410. The center apparatus 1402 is connected to the antenna apparatus 1404 via an optical cable 1403. The antenna apparatus 1404 has an optical-to-electric converter 1412 and a serial-to-parallel converter 1414.

The baseband processing unit 1406 of the center apparatus 1402 processes signals in parallel for the paired diversity branches Br0 and Br1, in addition to other baseband processing including code spreading and despreading. The parallel-to-serial converter 1408 converts the parallel signals for the diversity branches into a serial signal. The electric-to-optical converter 1410 converts the electric signal to an optical signal.

The optical-to-electric converter 1412 of the antenna apparatus 1404 converts the optical signal received via the optical cable 1403 into an electric signal. The serial-to-parallel converter 1414 converts the serial signal to parallel signals for the diversity branches Br0 and Br1.

In the third embodiment, signals for the diversity branches are time-multiplexed for transmission through a single optical cable 1403, and the time-multiplexed signal is separated at the antenna apparatus 1404 for the diversity branches. Accordingly, it is unnecessary for the communications system of the third embodiment to consider the phase difference due to difference in length of the optical cables provided in conjunction with the respective diversity antennas. However, from the viewpoint of providing redundancy as a countermeasure against failure or trouble, the second embodiment is also advantageous.

Figure 15:
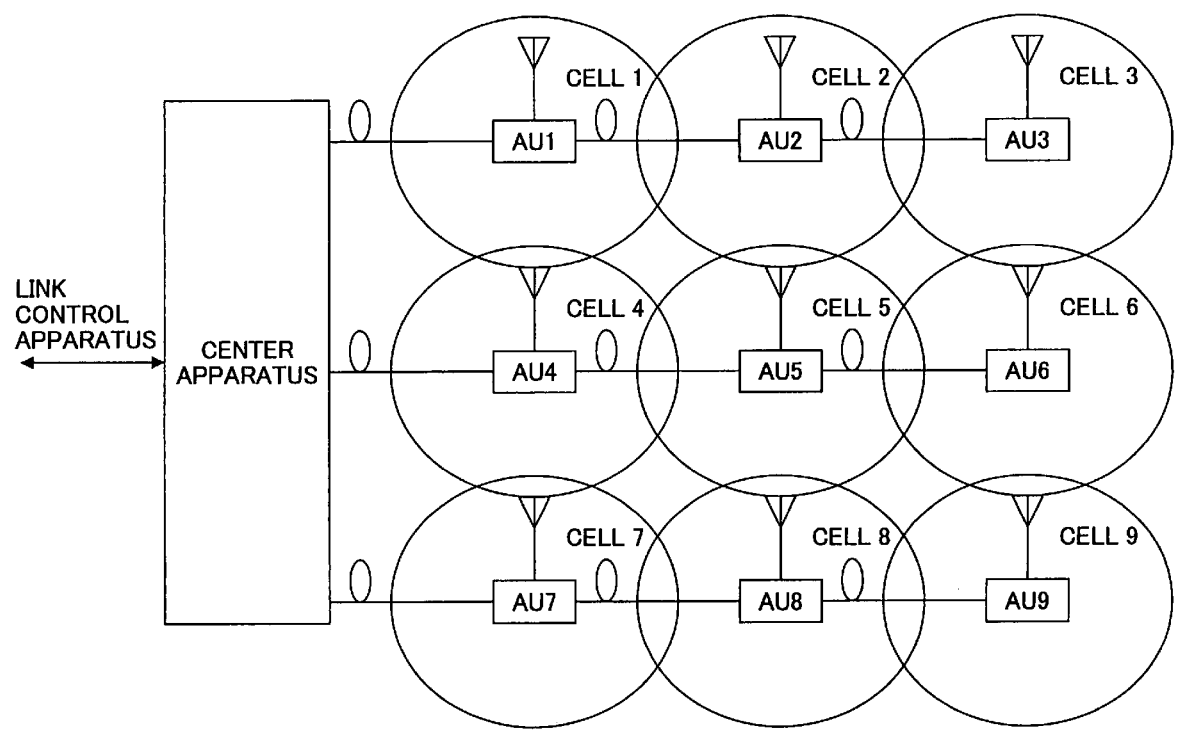
FIG. 15 is a schematic diagram of a communications system according to the fourth embodiment of the invention.

FIG. 15 is a schematic diagram of a communications system according to the fourth embodiment of the invention. In the system of the first embodiment shown in FIG. 3, multiple antenna apparatuses are connected in parallel to the center apparatus. In this embodiment, multiple antenna apparatuses are connected in series to the center apparatus, and multiple series of the antenna apparatuses are connected in parallel to the center apparatus.

Figure 16:
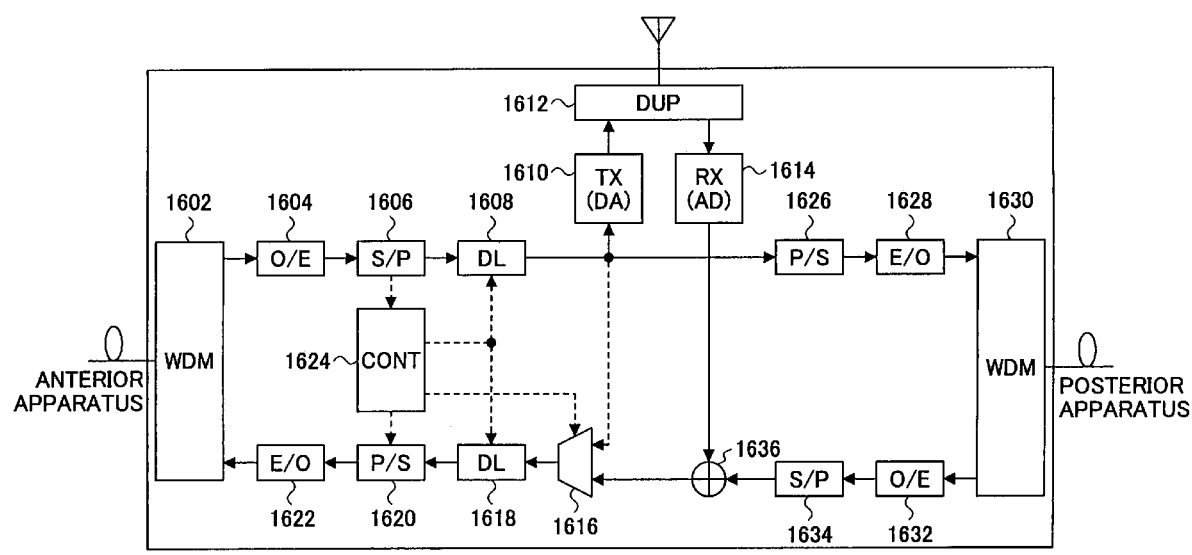
FIG. 16 is a block diagram of the antenna apparatus used in the communications system shown in FIG. 15.

FIG. 16 is a block diagram of the antenna apparatus used in the communications system shown in FIG. 15. The multiple antenna apparatuses shown in FIG. 5 may have the same structure. It is assumed that the antenna apparatus shown in FIG. 15 is inserted in series between an anterior component and a posterior component. The anterior component is, for example, the center apparatus or another antenna apparatus.

The antenna apparatus comprises WDM filter 1602, an optical-to-electric (O/E) converter 1604, a serial-to-parallel (S/P) converter 1606, a delay adjusting unit 1608, a transmission unit 1610, and a duplexer 1612. The antenna apparatus also comprises a receiving unit 1614, a selector 1616, a delay adjusting unit 1618, a parallel-to-serial (P/S) converter 1620, an electric-to-optical (E/O) converter 1622, and a controller 1624. The antenna apparatus further comprises a parallel-to-serial converter 1626, an electric-to-optical converter 1628, a WDM filter 1630, an optical-to-electric converter 1632, a serial-to-parallel converter 1634, and an adder 1636.

The WDM filter 1602 receives an optical signal (downlink signal) with wavelength $\lambda 1$, and supplies the received optical signal to the optical-to-electric converter 1604. The WDM filter 1602 also receives an optical signal with wavelength $\lambda 2$ from the electric-to-optical converter 1622, and transmits the optical signal to the anterior apparatus through the optical cable. The other WDM filter 1630 receives and transmits an optical signal from and to the posterior apparatus.

The optical-to-electric converters 1604 and 1632 convert optical signals to electric signals. The electric-to-optical converters 1622 and 1628 convert electric signals to optical signals. The serial-to-parallel converters 1606 and 1634 separate amplitude information. The parallel-to-serial converters 1620 and 1626 multiplex the amplitude information.

The delay adjusting unit 1608 adjusts (or delays) transmission timing by a quantity designated by the controller 1624. The transmission unit 1610 converts a digital signal being transmitted into an analog signal, and implements a process required for signal transmission, including frequency conversion and power amplification. The processed signal is transmitted from an antenna element via the duplexer 1612. The receiving unit 1614 performs signal processing, such as frequency conversion, on the signal received via the antenna element and the duplexer, and converts the signal to a digital signal.

The selector 1616 selects one of a signal output from the delay adjusting unit 1608 and a signal supplied from the adder 1636, in response to an instruction from the controller 1624, and supplies the selected signal to the delay adjusting unit 1618. The delay adjusting unit 1618 adjusts (or delays) the selected signal by a quantity designated by the controller 1604.

Antenna apparatuses AU1, AU4 and AU7 (see FIG. 15) connected in parallel are synchronized with each other using a process described in the first embodiment. Synchronization among antenna apparatuses AU1, AU2, and AU3 connected in series is achieved by the following process.

The time mark received at the WDM filter 1602 from the anterior apparatus is sent back to the anterior apparatus via the optical-to-electric (O/E) converter 1604, the serial-to-parallel (S/P) converter 1606, the delay adjusting unit 1608, the selector 1616, the delay adjusting unit 1618, the parallel-to-serial (P/S) converter 1620, the electric-to-optical (E/O) converter 1622, and the WDM filter 1602. The quantity of delay of this antenna apparatus is measured at the center apparatus.

The time mark received at the WDM filter 1602 from the anterior apparatus is also supplied to the posterior apparatus via the parallel-to-serial (P/S) converter 1626, the electric-to-optical (E/O) converter 1628, and the WDM filter 1630. The time mark sent back from the posterior apparatus is supplied to the adder 1636 via the optical-to-electric (O/E) converter 1632 and the serial-to-parallel (S/P) converter 1634, and then supplied to the selector 1616. The time mark is further sent back to the anterior apparatus via the delay adjusting unit 1618, the parallel-to-serial (P/S) converter 1620, the electric-to-optical (E/O) converter 1622, and the WDM filter 1602. The quantity of delay of the posterior apparatus can also be measured by the center apparatus. The center apparatus estimates the maximum delay ($\tau$max), as in the first embodiment, and controls the delay of each of the antenna apparatuses to bring them in synchronization.

Figure 19:
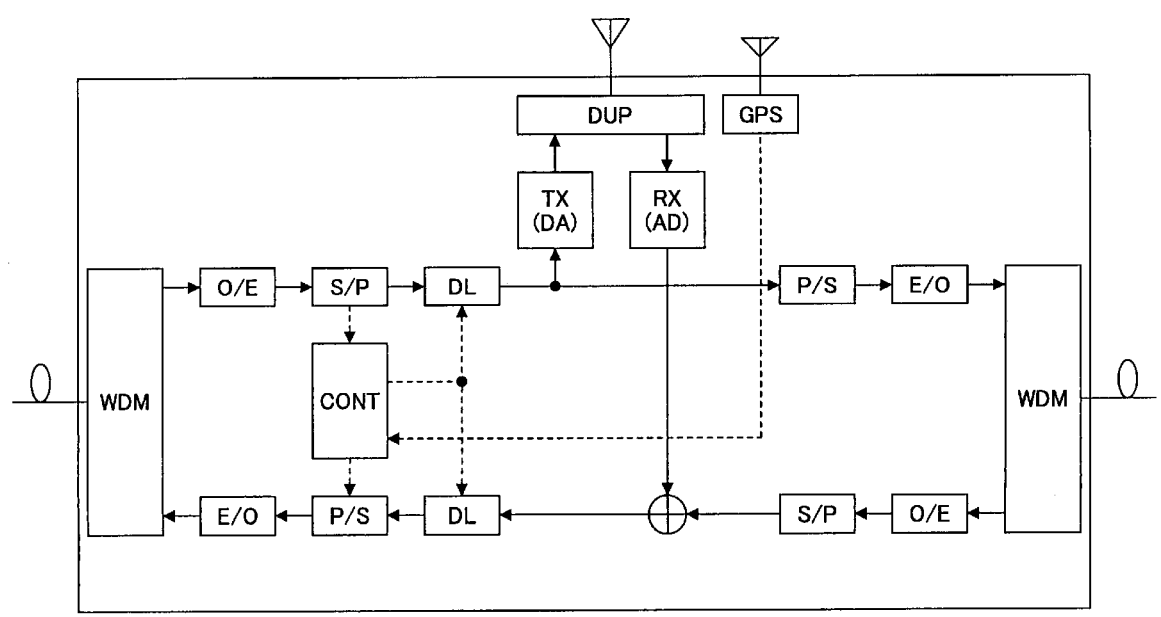
FIG. 19 illustrates a modification of the antenna.

If a GPS receiver is used in the system, as illustrated in FIG. 19, the quantity of delay of each of the antenna apparatus can be estimated making use of standard time information.

Figure 17:
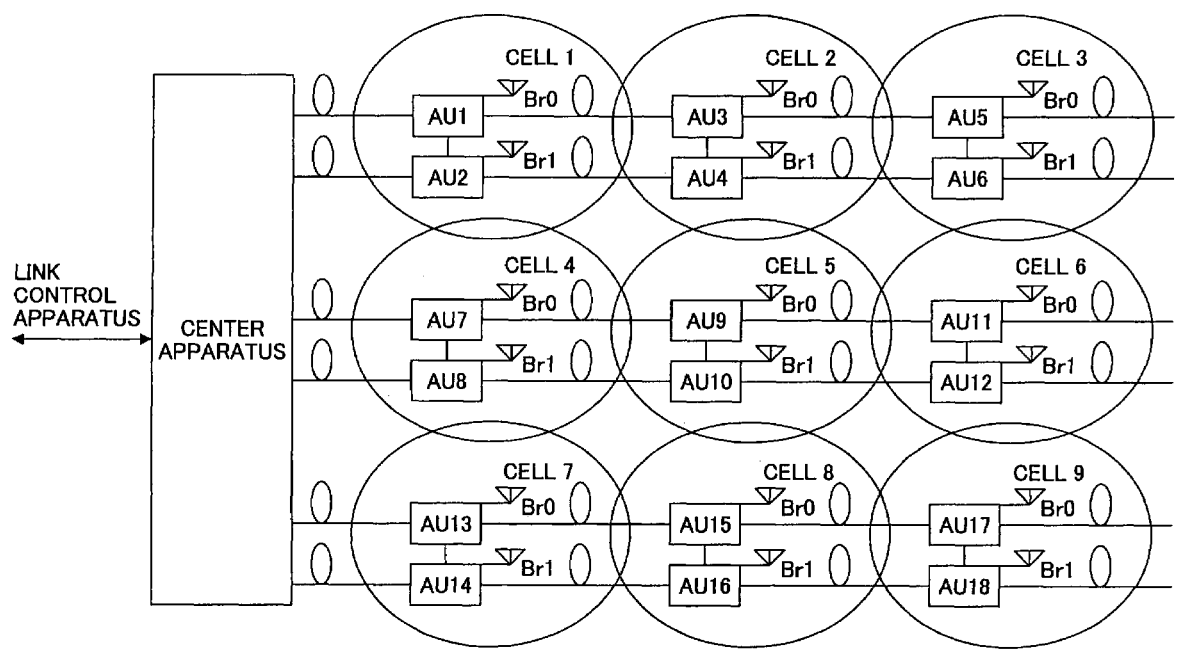
FIG. 17 is a schematic diagram of the communications system according to the fifth embodiment of the invention.

FIG. 17 is a schematic diagram of a communications system according to the fifth embodiment of the invention, which is a combination of the second embodiment and the fourth embodiment to perform antenna diversity in the serially connected multiple-antenna system.

Figure 18:
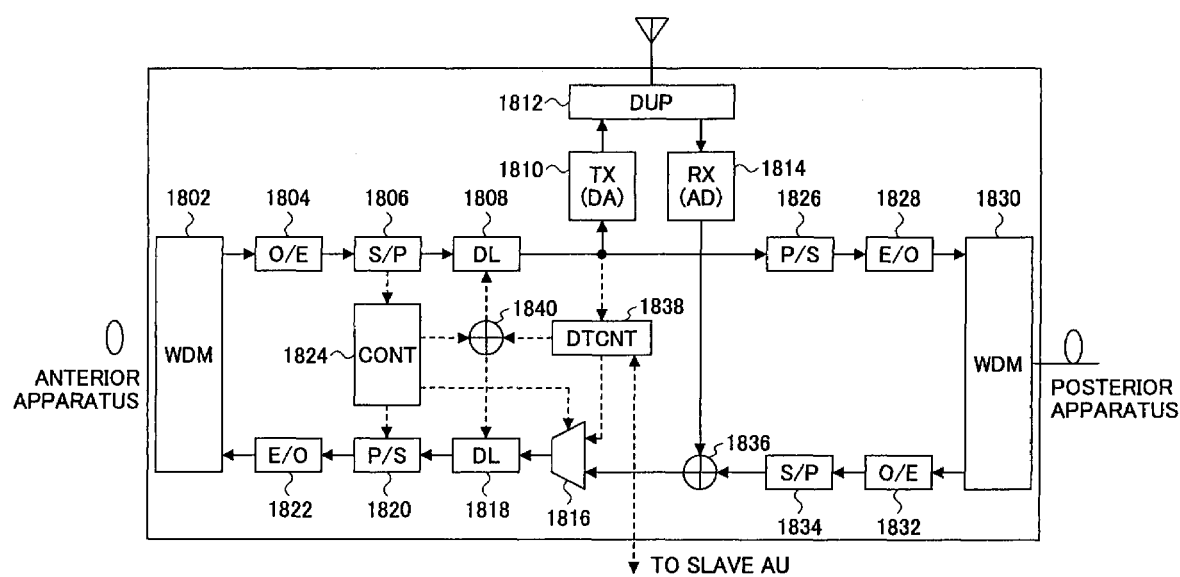
FIG. 18 is a block diagram of the antenna apparatus used in the communications system shown in FIG. 17.

FIG. 18 is a block diagram of the antenna apparatus used in the communications system shown in FIG. 17. The antenna apparatus comprises WDM filter 1802, an optical-to-electric (O/E) converter 1804, a serial-to-parallel (S/P) converter 1806, a delay adjusting unit 1808, a transmission unit 1810, and a duplexer 1812. The antenna apparatus also comprises a receiving unit 1814, a selector 1816, a delay adjusting unit 1818, a parallel-to-serial (P/S) converter 1820, an electric-to-optical (E/O) converter 1822, and a controller 1824. The antenna apparatus further comprises a parallel-to-serial converter 1826, an electric-to-optical converter 1828, a WDM filter 1830, an optical-to-electric converter 1832, a serial-to-parallel converter 1834, and an adder 1836. The antenna apparatus further comprises a phase difference control unit 1838 and an adder 1840.

The WDM filter 1802 receives a downlink optical signal, and supplies the optical signal to the optical-to-electric converter 1804. The WDM filter 1802 also receives an optical signal from the electric-to-optical converter 1822, and transmits the optical signal to the anterior apparatus through the optical cable. The other WDM filter 1830 receives and transmits an optical signal from and to the posterior apparatus.

The optical-to-electric converters 1804 and 1832 convert optical signals to electric signals. The electric-to-optical converters 1822 and 1828 convert electric signals to optical signals. The serial-to-parallel converters 1806 and 1834 separate amplitude information. The parallel-to-serial converters 1820 and 1826 multiplex the amplitude information.

The delay adjusting units 1808 and 1818 adjust (or delay) transmission timing by a quantity designated by the controller 1824 and the phase difference control unit 1838. The transmission unit 1810 converts a digital signal being transmitted into an analog signal, and implements a process required for signal transmission, including frequency conversion and power amplification. The processed signal is transmitted from an antenna element via the duplexer 1812. The receiving unit 1814 performs signal processing, such as frequency conversion, on the signal received via the antenna element and the duplexer, and converts the signal to a digital signal.

The selector 1816 selects one of a signal output from the phase difference control unit 1838 and a signal supplied from the adder 1836, in response to an instruction from the controller 1824, and supplies the selected signal to the delay adjusting unit 1818.

Antenna apparatuses are substantially synchronized with each other using the technique described in the fourth embodiment. In addition, the phases between the diversity branches are precisely matched with each other using the technique described in the second embodiment.

Although the preferred embodiments of the present invention have been described based on specific examples, the present invention is not limited to these examples. There are many substitutions and modifications without departing from the scope of the invention. For example, the number of diversity branches of each cell is not limited to two.

In addition, in the system shown in FIG. 3, at least one of the antenna apparatuses may have multiple antenna elements to perform the antenna diversity technique. In this case, this antenna apparatus has a serial-to-parallel (S/P) converter and an optical-to-electric (O/E) converter connected to the multiple antenna elements.

This patent application is based on and claims the benefit of the earlier filing date of Japanese Patent Application No. 2004-064363 filed Mar. 8, 2004, the entire contents of which are incorporated herein by reference.

What is claimed is:

1. A multiple-antenna system including a base station apparatus and a plurality of antenna apparatuses connected to the base station via optical cables, the system comprising:
    a first antenna apparatus and a second antenna apparatus connected to each other via an electric cable, each of the first and second antenna apparatuses receiving a reference pulse from the base station apparatus via the optical cables and estimating a time difference between the received reference pulse and the reference pulse supplied from the counterpart antenna apparatus via the electric cable, at least one of the first and second antenna apparatuses adjusting signal transmission timing based on the time differences estimated by the first and second antenna apparatuses.

2. The system of claim 1, wherein each of said antenna apparatuses receives the reference pulse from the base station and returns the received reference pulse to the base station, and the base station comprises:
    a timer configured to measure a time required to receive the reference pulse returned from each of the antenna apparatuses; and
    a delay detecting unit configured to detect a delay time for each of the antenna apparatuses based on the measured time.

3. The system of claim 2, wherein at least one of said antenna apparatuses is connected to another antenna apparatus via the optical cable, and wherein when said one of the antenna apparatuses receives the reference pulse from the base station apparatus, said one of the antenna apparatuses transmits the reference pulse to said other antenna apparatus via the optical cable.

4. A base station apparatus used in a multiple antenna system that includes a plurality of antenna apparatuses connected to the base station via optical cables, the base station apparatus comprising:
    a delay control unit configured to cause a reference pulse to be transmitted from the base station apparatus to each of the antenna apparatuses;
    a timer configured to measure a time required to receive the reference pulse returned from said each of the antenna apparatuses;
    a delay detecting unit configured to determine a delay time of said each of the antenna apparatuses based on the measure time,
    wherein a first antenna apparatus and a second antenna apparatus are connected to each other via an electric cable, each of the first and second antenna apparatuses receiving a reference pulse from the base station apparatus via the optical cables and estimating a time difference between the received reference pulse and the reference pulse supplied from the counterpart antenna apparatus via the electric cable, at least one of the first and second antenna apparatuses adjusting signal transmission timing based on the time differences estimated by the first and second antenna apparatuses.

5. The base station apparatus of claim 4, further comprising:
    a digital copy unit configured to digitally copy a downlink signal to be supplied from the base station to said antenna apparatuses; and
    a digital adder configured to sum up a plurality of uplink signals supplied from said antenna apparatuses.

6. The base station apparatus of claim 5 further comprising:
    a first bandlimiting unit configured to perform a first bandlimiting operation on the downlink signal before the digital copying; and
    a second bandlimiting unit configured to perform a second bandlimiting operation to the digitally added signal.

7. The base station apparatus of claim 4, further comprising:
    a baseband processing unit configured to perform baseband processing in common for said plurality of antenna apparatuses.

8. An antenna apparatus used in a multiple antenna system that includes a base station apparatus and a plurality of antenna apparatuses connected to the base station apparatus via optical cables, the antenna apparatus comprising:
    a time mark receiving unit configured to receive a time mark as a first received pulse from the base station via one of the optical cables;
    a time difference estimating unit configured to estimate a first time difference between the first received pulse and a second received pulse supplied from a second antenna apparatus via an electric cable; and
    a phase difference control unit configured to cause transmission timing to be controlled based on the first time difference and a second time difference supplied from the second antenna apparatus via the electric cable.

9. A multiple antenna system including a base station apparatus and a plurality of antenna apparatuses connected to the base station apparatus via optical cables, each of the antenna apparatuses being arranged in one of a plurality of sectors, wherein:
    at least one of the antenna apparatuses comprises multiple antenna elements for performing an antenna diversity technique, a serial-to-parallel converter connected to the antenna elements, and an optical-to-electric converter connected to the serial-to-parallel converter; and
    the base station apparatus comprises a baseband processing unit configured to perform baseband processing in common for the antenna apparatuses, and a plurality of electric-to-optical converters connected to the baseband processing unit via parallel-to-serial converters, wherein a first antenna apparatus and a second antenna apparatus are connected to each other via an electric cable, each of the first and second antenna apparatuses receiving a reference pulse from the base station apparatus via the optical cables and estimating a time difference between the received reference pulse and the reference pulse supplied from the counterpart antenna apparatus via the electric cable, at least one of the first and second antenna apparatuses adjusting signal transmission timing based on the time differences estimated by the first and second antenna apparatuses.

* * * * *